United States Patent
Douglas

(10) Patent No.: US 10,442,252 B2
(45) Date of Patent: Oct. 15, 2019

(54) TIRE WITH HIGH STRENGTH CORRUGATED SIDEWALLS

(71) Applicant: Jeffrey P Douglas, San Clemente, CA (US)

(72) Inventor: Jeffrey P Douglas, San Clemente, CA (US)

(*) Notice: Subject to any disclaimer, the term of this patent is extended or adjusted under 35 U.S.C. 154(b) by 0 days.

(21) Appl. No.: 15/094,833

(22) Filed: Apr. 8, 2016

(65) Prior Publication Data
US 2016/0297257 A1 Oct. 13, 2016

Related U.S. Application Data

(60) Provisional application No. 62/145,125, filed on Apr. 9, 2015.

(51) Int. Cl.
| | |
|---|---|
| *B60C 13/02* | (2006.01) |
| *B60C 17/00* | (2006.01) |
| *B60C 13/00* | (2006.01) |
| *B29D 30/08* | (2006.01) |
| *B60C 11/11* | (2006.01) |

(52) U.S. Cl.
CPC .............. *B60C 13/02* (2013.01); *B29D 30/08* (2013.01); *B60C 11/11* (2013.01); *B60C 17/00* (2013.01); *B60C 2200/10* (2013.01); *B60C 2200/14* (2013.01)

(58) Field of Classification Search
CPC ......... B60C 11/11; B60C 13/00; B60C 13/01; B60C 13/02–13/023; B60C 2013/026; B60C 17/009; B60C 17/08
See application file for complete search history.

(56) References Cited

U.S. PATENT DOCUMENTS

| | | | | | |
|---|---|---|---|---|---|
| 2,760,541 | A | * | 8/1956 | Reifenberger | ............ B60C 3/04 152/153 |
| 3,270,794 | A | * | 9/1966 | Skidmore | ............... B60C 23/18 152/153 |
| 3,400,746 | A | * | 9/1968 | Heimovics, Jr. | .......... B60C 3/08 152/522 |
| 3,850,218 | A | * | 11/1974 | Bertelli | ..................... B60C 3/00 152/454 |
| 4,365,659 | A | * | 12/1982 | Yoshida | ................ B60C 1/0008 152/510 |

(Continued)

FOREIGN PATENT DOCUMENTS

GB 1471883 * 5/1973 ............. B60C 13/00

*Primary Examiner* — Jodi C Franklin
(74) *Attorney, Agent, or Firm* — Morland C. Fischer

(57) ABSTRACT

A tire having a pair of high strength sidewalls lying opposite one another, wherein each sidewall has a plurality of plies that are shaped during manufacture to have a series of pleats or corrugations formed therein and stretching from the tire beads radially outward along the sidewalls. Each of the series of sidewall corrugations includes a pattern of alternating inwardly extending depressions and outwardly extending projections that extend continuously around the tire. The corrugations provide the sidewalls with an integral structural reinforcement, whereby the tire is advantageously capable of providing run flat support and avoiding damage to the rim on which the tire is mounted. According to a preferred embodiment, the tire herein disclosed is ideally suited for use on a motorcycle rim.

5 Claims, 2 Drawing Sheets

(56) References Cited

U.S. PATENT DOCUMENTS

| | | | |
|---|---|---|---|
| 4,405,007 A * | 9/1983 | Welter | B60C 3/00 |
| | | | 152/454 |
| 6,955,782 B1 | 10/2005 | Ratliff, Jr. | |
| 7,281,557 B2 * | 10/2007 | Merino Lopez | B60C 9/09 |
| | | | 152/454 |
| 7,320,350 B2 | 1/2008 | Wright | |
| 8,714,219 B2 * | 5/2014 | Colby | B29C 73/10 |
| | | | 152/367 |
| 8,739,849 B2 * | 6/2014 | Kuroishi | B60C 13/02 |
| | | | 152/153 |
| 9,656,515 B2 * | 5/2017 | Novoplanski | B60B 9/00 |
| 2003/0111152 A1 * | 6/2003 | Colantonio | B60C 15/06 |
| | | | 152/516 |
| 2005/0236086 A1 * | 10/2005 | Lopez | B60C 9/02 |
| | | | 152/454 |
| 2008/0190534 A1 * | 8/2008 | Malevergne | B60B 1/06 |
| | | | 152/379.3 |
| 2009/0277554 A1 * | 11/2009 | Donckels | B60C 9/0042 |
| | | | 152/517 |
| 2010/0043934 A1 | 2/2010 | Harvey | |
| 2011/0041971 A1 * | 2/2011 | Kuroishi | B60C 13/02 |
| | | | 152/153 |
| 2013/0049442 A1 * | 2/2013 | Sheikh-Bahaie | B60C 23/0493 |
| | | | 301/62 |
| 2015/0075690 A1 * | 3/2015 | Merritt | B60C 19/127 |
| | | | 152/501 |

\* cited by examiner

TIRE WITH HIGH STRENGTH CORRUGATED SIDEWALLS

CROSS REFERENCE TO RELATED APPLICATIONS

This application claims the benefit of priority from Provisional Patent Application. No. 62/145,125 filed Apr. 9, 2015.

BACKGROUND OF THE INVENTION

1. Field of the Invention

This invention relates to a tire having high strength side walls wherein the sidewalls are manufactured with a pattern of alternating and radially aligned inwardly and outwardly extending pleats or corrugations. The tire herein disclosed has particular application to be installed on a motorcycle and offers the advantage of improved structural integrity for the sidewalls so as to avoid potential damage to the rim and provide ran flat support.

2. Background Art

Depending upon the vehicle and/or the terrain over which the vehicle will be driven, it is often necessary to have available a high strength tire that is suitable to withstand the forces to which the tire will be subjected during its use. A common practice to produce a high strength tire is to increase the thickness of the sidewall and/or add additional fibrous textile plies around the tire circumference. As a consequence of the aforementioned conventional, manufacturing technique of adding more material to the tire to increase its strength, the weight of the tire is correspondingly increased. In this same regard, adding weight to a tire is likely to adversely affect the vehicle's performance as well as the fuel costs of the vehicle on which a set of the heavy tires is installed.

Accordingly, what would be desirable is a tire that can be manufactured, with sidewalls of increased strength, but without adding significant weight to the tire, negatively impacting the vehicle's performance, or increasing the cost of operating a vehicle on which a set of the tires is installed.

SUMMARY OF THE INVENTION

In general terms, a rubber tire is disclosed having high strength sidewalls and being ideally suited for use on a motorcycle rim. The high strength sidewalls of the tire are manufactured (e.g., molded) to include radially aligned pleats or corrugations that extend circumferentially therearound. In particular, die corrugations include a series of alternating inwardly extending depressions and outwardly extending projections that is formed in each of the sidewalls. That is, the fibrous plies in the sidewall casings are shaped to create the alternating depressions and projections so as to lie side-by-side one another and slope in alternating opposite directions. Each corrugation encompasses the reinforced bead that lays inside and against a lip of the rim and stretches from the bead radially along a sidewall below the crown of the tire. By virtue of the foregoing, the sidewalls of the tire are advantageously provided with structural reinforcement and rigidity or stiffening relative to conventional tires without having to add material or significantly increasing the weight of the tire. In addition, the corrugated sidewalls enable the tire to avoid damage to the rim and provide rim flat support.

DESCRIPTION OF THE PREFERRED EMBODIMENT

Figure 1:
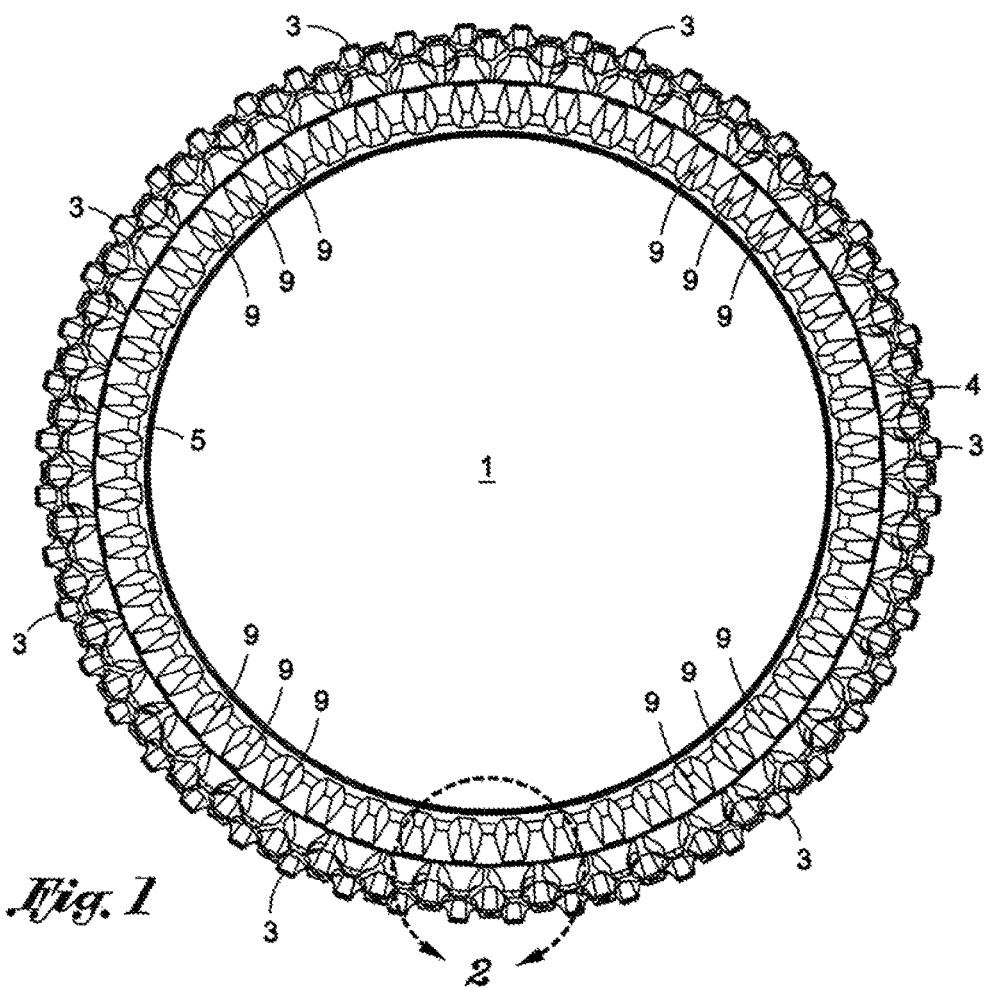
FIG. 1 shows a tire manufactured with its sidewalls having a series of corrugations formed therein in accordance with a preferred embodiment of this invention.
Figure 2:
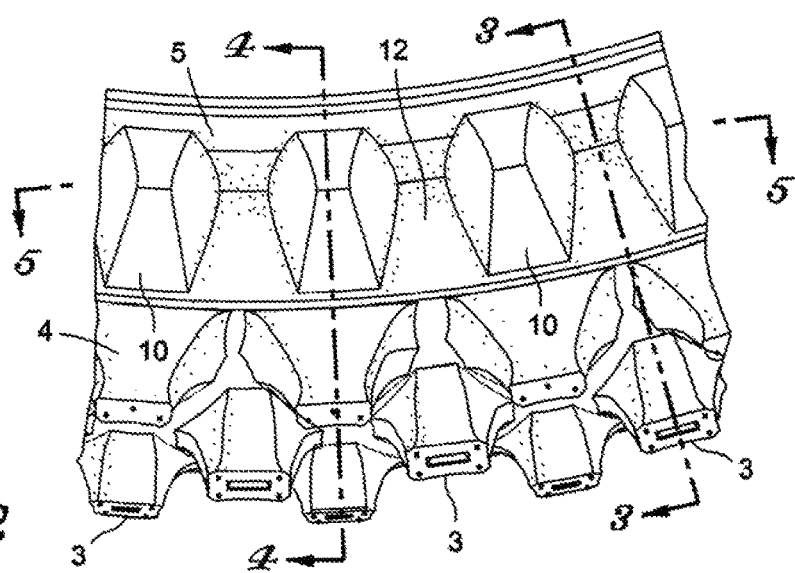
FIG. 2 is an enlarged detail taken from FIG. 1 showing the series of corrugations formed in one sidewall of the tire.

Referring concurrently to FIGS. 1-5 of the drawings, there is shown a rubber tire 1 having a unique high strength sidewall configuration by which the sidewalls have a high strength characteristic that is especially adapted to provide the tire with run flat support. The tire 1 shown in the drawings is one that would be ideally used by a motorcycle. However, the advantages of this invention are not limited to any particular vehicle on which the tire will be installed.

As in the case of many conventional tires, the tire 1 shown in FIGS. 1-5 has a knobby tread 3 extending outwardly from and running circumferentially around the crown 4 thereof. The size, shape and presence of the tread 3 that is molded into the rubber tire should likewise not be considered a limitation of this invention. By way of example only, the tread 3 carried by the tire 1 and shown in the drawings is especially suited for riding over dirt roads and off-road terrain.

In accordance with a preferred embodiment of this invention, the high strength characteristic of the tire 1 is achieved by manufacturing (e.g., molding) the sidewalls 5 and 7 with a series of radial pleats or corrugations 9 that are aligned side-by-side one another and extend continuously and circumferentially around each sidewall. More particularly, each of the series of corrugations 9 at each sidewall includes a pattern of alternating inwardly extending depressions 10 and outwardly extending projections 12. During manufacture of the tire 1, either one or a plurality of fibrous textile plies 14 that are usually bonded one above the other to form the casing for the sidewalls 5 and 7 are manipulated and shaped (e.g., molded) to create the pattern of alternating depressions 10 and projections 12 by which to establish the corrugations 9 in the sidewalls.

Depending upon the application of the tire 1 and the vehicle on which the tire will be mounted, the number, spacing and depth (or height) of the sidewall corrugations 9 can vary from one tire to another. However, by virtue of the corrugations 9 being formed in the sidewalls 5 and 7 by shaping the fibrous textile plies 14 thereof, the sidewalls of the tire 1 are advantageously provided with an improved structural reinforcement and rigidity or stiffening relative to conventional tires without having to thicken the sidewalls and/or add additional plies. It may therefore be appreciated that the tire 1 herein disclosed avoids the common practice of adding additional rubber and fibrous material to the sidewalls in order to improve strength which is known to undesirably add weight and increase the cost to manufacture the tire. Also being advantageously avoided is the corresponding negative impact on the vehicle's performance and the fuel consumption of the vehicle on which a set of the improved tires is installed.

Figure 3:
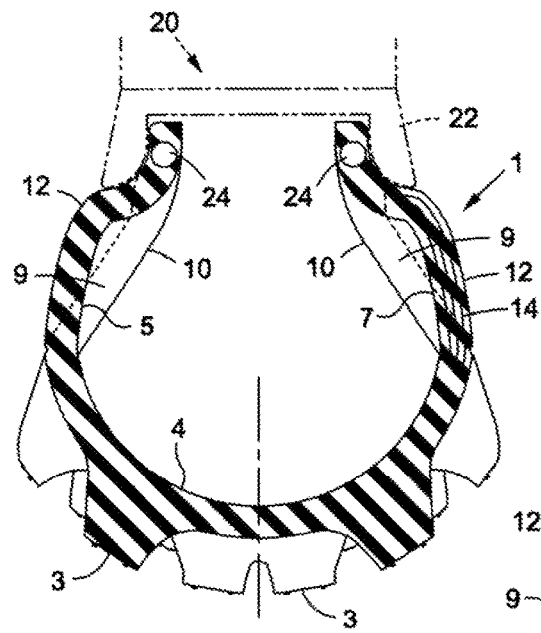
FIG. 3 is a cross-section taken along lines 3-3 of FIG. 2 showing outwardly extending projections from the series of corrugations formed in the sidewall of the tire.
Figure 4:
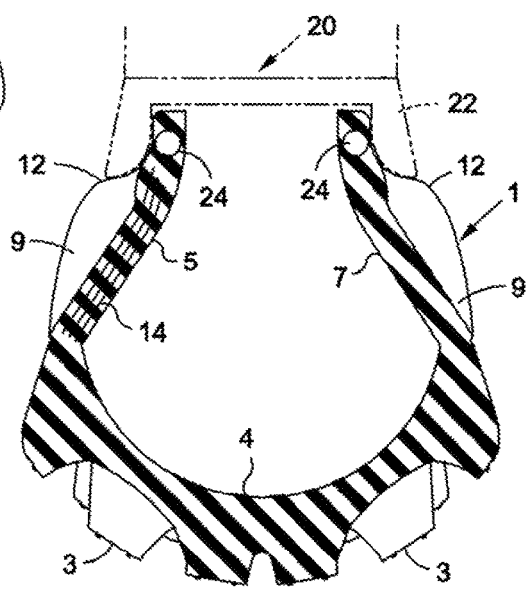
FIG. 4 is a cross-section taken along lines 4-4 of FIG. 2 showing inwardly extending depressions from the series of corrugations formed in the sidewall of the tire.
Figure 5:
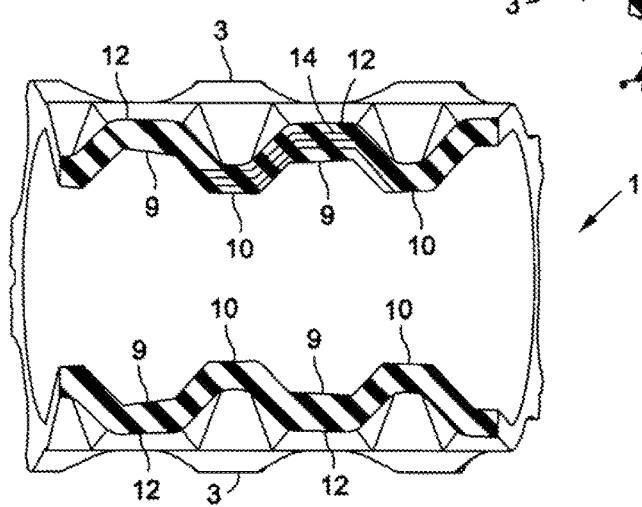
FIG. 5 is a cross-section taken along lines 5-5 of FIG. 2 showing the series of corrugations having alternating outwardly extending projections and inwardly extending depressions formed in the sidewalls of the tire.

Referring particularly to FIGS. 3 and 4, the improved tire 1 is shown relative to a rim 20 of the vehicle on which the tire is mounted. The tire 1 is located on the rim 20 so that the innermost end of each corrugation from each of the series of corrugations 9 formed in the sidewalls 5 and 7 lay over and are supported by the lips 22 of rim 20. In this same regard, the radially innermost ends of the sidewall corrugations 9 encompass the usual reinforced tire beads 24.

More particularly, FIGS. 3 and 4 illustrate the opposing high strength sidewalls 5 and 7 which lie below the crown 4 of the tire 1. In a preferred embodiment of this invention, the corrugations 9 that are formed in and extend circumferentially around the tire 1 stretch from the reinforced beads 24 and radially outward therefrom along the sidewalls 5 and 7 below the crown 4.

By virtue of the corrugations 9 stretching radially outward from the beads 24 which lie inside of the lips 22 of the rim 20, three sidewalls 5 and 7 of the tire 1 are advantageously stiffened and stabilized adjacent the lips 22. That is, the corrugations 9 provide the plies 14 of the sidewalls 5 and 7 of the tire 1 with a trussed support and structural reinforcement that extend in both radial and lateral directions. Such a trussed support offers greater rim protection during road impacts and better sidewall stability when the tire 1 is subjected to side loads during cornering. In this same regard, the corrugations 9 running radially along the sidewalls 5 and 7 from the beads 24 absorb impact forces and thereby reduce potential damage to the rim 20. Accordingly, and as explained above, a relatively lightweight and cost efficient tire having high strength sidewalls can be manufactured having particular application for providing a tire with run flat support.

The invention claimed is:

1. A combination, comprising:

a rim having first and opposite sides and a peripheral lip extending around each of the first and opposite sides of said rim, each peripheral lip having an inside wall, an outside wall, a bottom coextensively connected to said rim, and a top lying opposite and spaced from said bottom by said inside and said outside walls; and a tire mounted on said rim, said tire having a crown extending circumferentially therearound, a pair of sidewalls located below the crown and lying opposite one another to surround said rim and lay against the peripheral lips at the first and opposite sides of said rim, and a series of corrugations formed in at least one of said pair of sidewalls, said series of corrugations having first and opposite ends and alternating inwardly extending depressions and outwardly extending projections that are aligned side-by-side one another and that run radially along the at least one of said pair of sidewalls such that the first end of said series of corrugations is located so as to be trussed across the top of one peripheral lip at one of the sides of the rim in order to provide side load stability to the tire at said rim when the tire is subjected to side loads during cornering.

2. The combination recited in claim 1, wherein said alternating inwardly extending depressions and outwardly extending projections from the series of corrugations formed in the at least one of said pair of sidewalls slope in opposite directions relative to one another.

3. The combination recited in claim 1, wherein each of the pair of sidewalls of said tire has a bead extending therearound which is covered by and lies adjacent the one peripheral lip at the one of the sides of said rim, and each of the inwardly extending depressions and outwardly extending projections of the series of corrugations formed in the at least one of said pair of sidewalls extends from the bead of the one of said pair of sidewalls.

4. The combination recited in claim 1, wherein the outwardly extending projections of the series of corrugations formed in the at least one of said pair of sidewalls run from a position lying outwardly from the outside wall of the one peripheral lip of the rim towards the inside wall of said one peripheral lip.

5. The combination recited in claim 1, wherein the inwardly extending depressions of the series of corrugations formed in the at least one of said pair of sidewalls run from a position lying inwardly of the inside wall of the one peripheral lip of the rim towards the outside wall of said one peripheral lip.

* * * * *